United States Patent
La Dous

(10) Patent No.: US 7,335,702 B2
(45) Date of Patent: Feb. 26, 2008

(54) PHOTOCHROMIC PLASTIC OBJECT

(75) Inventor: Jobst La Dous, Krefeld (DE)

(73) Assignees: Rodenstock GmbH, Munich (DE); Jobst La Dous, Krefeld (DE)

( * ) Notice: Subject to any disclaimer, the term of this patent is extended or adjusted under 35 U.S.C. 154(b) by 0 days.

(21) Appl. No.: 10/628,307

(22) Filed: Jul. 29, 2003

(65) Prior Publication Data

US 2004/0138382 A1 Jul. 15, 2004

Related U.S. Application Data

(63) Continuation of application No. PCT/EP02/00842, filed on Jan. 25, 2002.

(30) Foreign Application Priority Data

Jan. 29, 2001 (DE) ................................ 101 03 784

(51) Int. Cl.
*C08L 75/00* (2006.01)
(52) U.S. Cl. ..................................... 525/131; 524/589
(58) Field of Classification Search ................ 524/589, 524/590, 556; 525/123, 131; 252/586
See application file for complete search history.

(56) References Cited

U.S. PATENT DOCUMENTS

| | | | | |
|---|---|---|---|---|
| 5,674,942 | A | * 10/1997 | Hill et al. | 525/131 |
| 5,886,101 | A | * 3/1999 | Sommerfeld et al. | 525/112 |
| 6,067,186 | A | 5/2000 | Dalton et al. | |
| 6,153,363 | A | 11/2000 | Nair et al. | |
| 6,498,218 | B2 | * 12/2002 | Barrera et al. | 525/454 |
| 6,653,141 | B2 | * 11/2003 | Singaram et al. | 436/95 |
| 6,749,779 | B2 | * 6/2004 | Soane et al. | 264/1.1 |

FOREIGN PATENT DOCUMENTS

| | | |
|---|---|---|
| EP | 0735097 | 10/1996 |
| EP | 0927730 | 7/1999 |
| FR | 2674529 | 10/1992 |

OTHER PUBLICATIONS

Search Report.

* cited by examiner

*Primary Examiner*—Randy Gulakowski
*Assistant Examiner*—John J. Figueroa
(74) *Attorney, Agent, or Firm*—Crowell & Moring LLP

(57) ABSTRACT

A photochromic plastic object made of a transparent synthetic resin material composed of at least two mutually penetrating polymer networks of different polymer materials and containing at least one photochromic dye homogeneously distributed therein, and a method for producing such a photochromic object.

9 Claims, 1 Drawing Sheet

PHOTOCHROMIC PLASTIC OBJECT

CROSS REFERENCE TO RELATED APPLICATIONS

This application is a continuation of international patent application no. PCT/EP02/00842, filed Jan. 25, 2002, designating the United States of America, and published in German as WO 02/060984, the entire disclosure of which is incorporated herein by reference. Priority is claimed based on Federal Republic of Germany patent application No. DE 101 03 784.8, filed Jan. 29, 2001.

BACKGROUND OF THE INVENTION

This invention relates to a photochromic plastic object made of a transparent plastic (i.e., synthetic resin) material composed of at least two interpenetrating polymer networks of different polymer materials and containing at least one photochromic dye homogenously distributed therein. The invention also relates to a method for the production thereof.

A number of methods for the production of photochromic plastic objects, especially lenses for eyeglasses, are known in the art and are used industrially: namely mass dying, i.e., adding the photochromic dyes to the casting resin mixture prior to polymerization; surface dying, where the photochromic dyes are introduced by thermal diffusion into at least one surface of the at least partially cured plastic material forming the plastic object ("matrix") typically using an intermediate carrier that absorbs the photochromic molecules prior to diffusion and that is subsequently removed again; and coating, where an approximately 10-50 µm thick photochromic film is applied to the cured plastic object.

In all cases the surrounding matrix strongly influences the photochromic properties of the dyes used. To a lesser degree this is true for the color, to a greater degree for the service life, i.e., the period for which the corresponding photochromic plastic object can be used, and in particular for the kinetic properties, i.e., the darkening and brightening rate, the darkening depth and their dependence on the temperature.

Thus, synthetic resin materials for use with photochromic dyes should meet two—usually contradictory—requirements. On the one hand they should offer sufficient free space so that after excitation by light the photochromic molecules can structurally rearrange themselves as freely as possible into the open, colored form and at the end of exposure to light or with the onset of darkening can revert back to their closed, colorless form. For most fields of application, this requires a narrow time window. For darkening this time window typically ranges from 10 to 100 seconds and for brightening from 1 to 10 minutes. On the other hand, since most photochromic molecules in their open form are sensitive to atmospheric oxygen, the synthetic resin matrix must be as resistant to diffusion as possible. This diffusion resistance is difficult to reconcile with a polymer network with large free spaces. The currently available plastic or synthetic resin materials have either a good service life—associated, however, with comparatively slow darkening and brightening kinetics—or they exhibit rapid reaction kinetics in response to different lighting intensities—but only within an extremely limited lifetime. The first group includes synthetic resin materials that are used in comparatively expensive consumer articles, e.g., lenses for eyeglasses, which are expected and required to have a service life of several years. Characteristic for this group, as a rule, is the use of a typically rigid synthetic resin matrix with a material thickness of at least 1 to 2 mm. The second group includes synthetic resin materials primarily used for novelty or fashion items, which are not expected to have a long service life, e.g., toys or consumer textiles, such as T-shirts. The synthetic resin matrix used for this purpose is usually flexible, e.g., in the form of films, or is not dimensionally stable in itself, e.g., in the case of coatings and varnishes. Here, the material thickness of the photochromic synthetic resin matrix is typically less than 1 millimeter.

Synthetic resin materials whose polymer network is formed by a chemical reaction such as polyaddition or polycondensation are currently used exclusively in the prior art. This formation can also be effected in steps: i.e., by using different initiators, a preliminary cross-linking is effected first and a final cross-linking at an elevated temperature thereafter. Known, for example, are acrylates, especially for eyeglass lenses, epoxy resins (EP-A-0 556 646, JP-A-47 015 122, DE-A-33 08 186) or polyurethanes and polythiourethanes (U.S. Pat. No. 4,889,413). For contact lenses polyureas are also used (EP-A-0 735 097, EP-A-0 748 685). FR 2,674,529 discloses a photochromic synthetic resin object based on a polyallyl carbonate of bisphenol A, where a photochromic dye is introduced by diffusion into the synthetic resin object after its polymerization. This dyeing technique involves allylic monomers requiring very aggressive initiators (PIP) in high concentrations (approximately 3%). However, introducing a photochromic dye by diffusion in a dye bath into the plastic object usually reduces the photochromism and thus results in an unsatisfactory service life of the photochromic synthetic resin object.

SUMMARY OF THE INVENTION

Accordingly, it is an object of the present invention to provide a photochromic plastic or synthetic resin object, which on the one hand, has a long service life and on the other hand comprises a photochromic synthetic resin matrix which is freely configurable, e.g., has a flexible form, and enables or ensures rapid kinetics of photochromic dyes introduced therein.

Another object of the invention is to provide a photochromic plastic object having a synthetic resin matrix which has no adverse effect on the activation energy of the reverse reaction, i.e., from the open to the closed form, so that the temperature dependence of the darkening reaction is low.

A further object of the invention is to provide a method for producing a plastic photochromic object of the aforementioned type.

These and other objects are achieved in accordance with the present invention by providing a photochromic plastic object comprising a transparent synthetic resin body composed of at least two interpenetrating polymer networks of different polymer materials and at least one photochromic dye homogeneously distributed therein.

In accordance with a further aspect of the invention, the objects are achieved by providing a method of producing a transparent synthetic resin body composed of at least two interpenetrating polymer networks of different polymer materials and at least one photochromic dye homogeneously distributed therein, the method comprising initially producing a first polymer network composed of a first polymer material; subsequently producing a second polymer network composed of a second polymer material different from said first polymer material in such a way that the two networks of different polymer materials interpenetrate, and adding the at least one photochromic dye before or during polymerization.

In particular, a photochromic plastic object is provided, comprising a transparent synthetic resin body formed from two interpenetrating polymer networks made of different polymer materials and at least one photochromic dye homogenously distributed therein.

In the method according to the invention for producing such a photochromic plastic object, the polymer networks of the different polymer materials are formed successively in time. In other words, the plastic object according to the invention is obtained by a method in which starting from the correspondingly selected first monomer(s) a first polymer network is initially formed from a first polymer material, preferably without using any initiators. Thereafter, starting from the corresponding second monomer(s) selected, a second, additional polymer network is formed such that the two networks of different polymer materials interpenetrate. The at least one photochromic dye is already added before and/or during polymerization, i.e., in a mass dyeing process, so that the at least one photochromic dye is homogenously distributed in the plastic material.

To ensure that the first, previously formed polymer network is penetrated by the second polymer network, the corresponding second monomer(s) must already be present in the reaction vessel during formation of the first polymer network forming the plastic object according to the invention. The second monomer(s) is/are thus subject to the requirement that they may not become involved in the formation of the first polymer network under the selected process conditions, i.e., the second monomer components may not react with the first monomer components and/or with themselves under the process conditions selected for forming the first polymer network. On the other hand, no phase separation of the second monomer component(s) from the previously formed first polymer network may occur.

The formation of the first polymer network can be based on polyaddition, for example, preferably at room temperature, while the formation of the second polymer network can be based on thermal, radical or UV-light initiated polymerization, if desired, at an elevated temperature.

According to the present invention, the synthetic resin matrix used in the photochromic plastic object is composed of at least two interpenetrating polymer networks of different polymer materials. In one preferred embodiment of the present invention one of the at least two interpenetrating polymer networks is made of polyurea or polyurethane, particularly preferably polyurea.

Within the scope of the present invention, polynreas or polynrethanes are generally understood to be linear or branched-chain polymers having the general structure

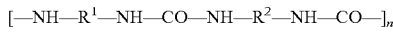

or

i.e., linear or branched-chain polymers linked via urea bonds or urethane bonds, where R1 and R2 represent, respectively, aliphatic or aromatic radicals or groups, e.g., polyether, and n represents the degree of polymerization, where n=2 to ∞. Such a polymer network of polyurea can be obtained by reacting bifunctional or trifunctional amines with bifunctional or multifunctional aliphatic, cycloaliphatic or aromatic isocyanates.

The bifunctioal or trifunctional amines used can be, for example, trifunctional polyether with molecular weights ranging from 3,000 to 10,000 g/mol, preferably 4,000 to 6,000 g/mol, with amino groups bonded to their terminal ends. In particular, amines marketed by Huntsman under the trade name Jeffamines T 5000 or D 2000 may be used.

The bi- or multifunctional aliphatic, cycloaliphatic or aromatic isocyanates used can be, for example, phenylene diisocyanate, tolylene diisocyanate, hexamethylene diisocyanate (HDI) or modified isophorone diisocyanate. In particular, isocyanates marketed by Bayer A G under the trade names Isocyanate 316, Isocyanate 3200 or Isocyanate 3400 may be used.

The second, additional polymer network can preferably be made of polyacrylate, polymethacrylate or a mixture thereof. The acrylic monomer components used may be, for example, methyl acrylate, ethyl acrylate, propyl acrylate, butyl acrylate, methyl (meth)acrylate, ethyl (meth)acrylate, propyl (meth)acrylate, butyl (meth)acrylate, or trimethylolpropane trimethacrylate (TMPTMA). In particular, TMPTMA marketed by Röhm GmbH may be used.

In the process according to the invention, the reaction to form polyurea when the first polymer network is being produced preferably proceeds without an initiator and at room temperature to protect the photochromic molecules. To avoid an excessively high reaction rate between the amine component and the isocyanate component, i.e., to delay the polymerization reaction, e.g., acrylic acid may be added to the initially introduced amine monomer component. The subsequent reaction of the acrylic monomers to form the second polymer network then proceeds preferably at room temperature with a mild radical initiator, or without such an initiator but at an elevated temperature.

Typically, mild peroxidic initiators, e.g., tetrabutyl perneodecanoate (TBPND), marketed by Peroxidchemie, or lauryl peroxide are used. In this type of process management, the second polymer network penetrates the first, previously formed polymer network.

The quantitative ratio of the first polymer network to the second polymer network is not subject to any specific limitation. Rather, it is adjusted according to the desired material requirements, for example in the range of 10:90 to 90:10 relative to the weight percent of the corresponding polymer networks.

In this type of process management, it is particularly advantageous if the first polymer network is formed without using an initiator. In contrast, when the second polymer network is formed, which penetrates the first network, only small amounts, e.g., 0.1 to 1.5%, of a mild initiator such as lauryl peroxide or TBPND are used. Alternatively, the second polymer network can be formed at an elevated temperature without using such an initiator.

This type of process makes it possible to add the photochromic compound(s) before polymerization. The economic and technical advantages of mass dyeing compared to subsequent surface dyeing by diffusion, as conducted, for example, in FR 2,674,529, are well known to a person skilled in this field.

Surprisingly, the photochromic plastic materials according to the invention are distinguished by their high transparency, low initial coloration, good service life and rapid darkening and lightening kinetics of the photochromic reaction.

DESCRIPTION OF THE INVENTION

Figure 1:
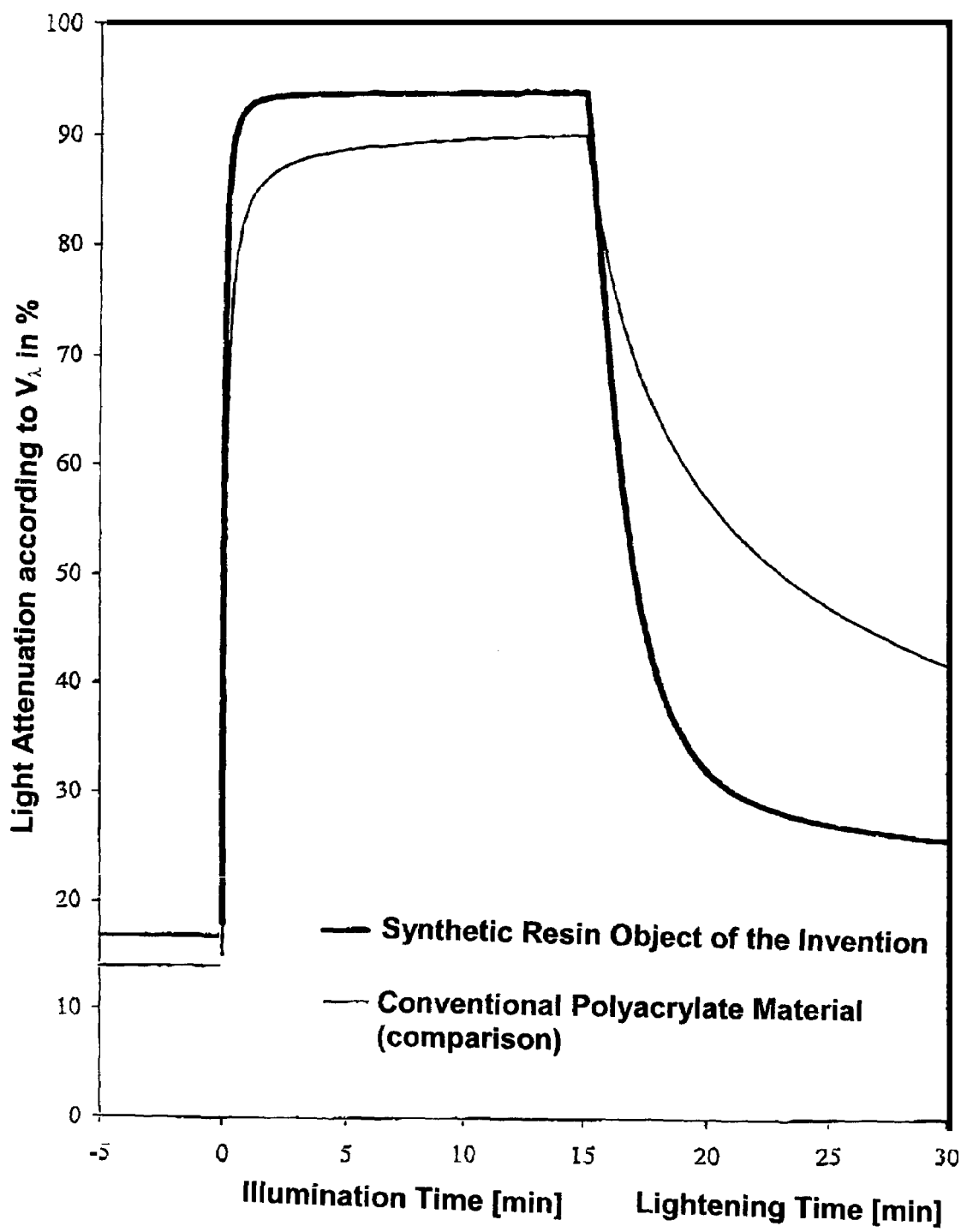
FIG. 1 is a graph illustrating the improved darkening and lightening behavior of a photochromic plastic object produced according to the invention as compared to a conventional photochromic polyacrylate material.

The plastic material according to the invention can be produced in any desired layer thickness. It can be readily processed, no bubbles form during polymerization, and its mechanical properties can be adjusted in a wide range between gel-like and dimensionally stable, depending on the intended application. Depending on the corresponding material thickness, the photochromic plastic objects according to the invention can be used directly as photochromic lenses, visors or window glazings. Alternatively, they can also be applied to a fixed support or a fixed substrate, e.g., a polycarbonate substrate. They can also be used between protective or carrier films. Finally, the photochromic plastic objects according to the invention can also be applied to substrates based on inorganic, e.g., mineral glass-based, materials with a large material thickness, e.g., laminated glazings.

The photochromic compounds used for the present invention are not subject to any specific limitation. They are preferably selected from the class of benzopyrans and higher fused ring systems derived therefrom, particularly, e.g., naphthopyrans or fluorenopyrans. For example, [2H]-naphtho(1,2-b)-pyrans substituted in the 2,2 position with aromatic or heteroaromatic groups, or [3H]-naphtho(2,1-b)-pyrans correspondingly substituted in the 3,3 position, e.g., the naphthopyrans described in PCT/DE98/02820 and the indeno[2,1-f]naphtho[1,2-b]pyran derivatives described in PCT/EP99/05258 and/or spiro-9-fluoreno[1,2-b]pyran derivatives may be used. Examples which may be mentioned include:

3,13-diphenyl-3-(4-diphenylaminophenyl)-13-hydroxy-6-methoxy-indeno[2,1-f]-naphtho[1,2-b]pyran, 13-(2,5-dimethylphenyl)-3-(4-diphenylaminophenyl)-13-hydroxy-6-methoxy-3-phenyl-indeno[2,1-f]-naphtho[1,2-b]pyran, 13-(2,5-dimethylphenyl)-3-(4-diphenylaminophenyl)-13-hydroxy-3-phenyl-indeno[2,1-f]-naphtho[1,2-b]pyran, Spiro-9-fluoreno-13'-[3-(4-dimethylaminophenyl)-6-methoxy-3-phenyl-indeno[2,1-f]naphtho[1,2-b]pyran], Spiro-9-fluoreno-13'-[3-(4-dimethylaminophenyl)-3-phenyl-indeno[2,1-f]naphtho[1,2-b]pyran], Spiro-9-fluoreno-13'-[3-(4-diphenylaminophenyl)-6-methoxy-3-phenyl-indeno[2,1-f]naphtho-[1,2-b]pyran], Spiro-9-fluoreno-13'-[3-(4-diphenylaminophenyl)-3-phenyl-indeno[2,1-f]naphtho-[1,2-b]pyran], Spiro-9-fluoreno-13'-{3-[4-(N-morpholinyl)phenyl]-6-methoxy-3-phenyl-indeno[2,1-f]naphtho-[1,2-b]pyran}, Spiro-9-fluoreno-13'-{3-[4-(N-morpholinyl)phenyl]-3-phenyl-indeno[2,1-f]naphtho-[1,2-b]pyran}, Spiro-9-fluoreno-13'-{6-methoxy-3-phenyl-3-[4-(N-piperidinyl)phenyl]-indeno[2,1-f]naphtho[1,2-b]pyran} and Spiro-9-fluoreno-13'-{3-phenyl-3-[4-(N-piperidinyl)phenyl]-indeno[2,1-f]naphtho-[1,2-b]pyran} and, for example, 3-(4-diphenylaminophenyl)-3-(2-fluorophenyl)-3H-naphtho[2,1-b]pyran, 3-(4-dimethylaminophenyl)-3-(2-fluorophenyl)-3H-naphtho[2,1-b]pyran, 3-(2-fluorophenyl)-3-[4-(N-morpholinyl)phenyl]-3H-naphtho[2,1-b]pyran, 3-(2-fluorophenyl)-3-[4-(N-piperidinyl)phenyl]-3H-naptho[2,1-b]pyran, 3-(4-dimethylaminophenyl)-6-(N-morpholinyl)-3-phenyl-3H-naphtho[2,1-b]pyran, 6-(N-morpholinyl)-3-[4-(N-morpholinyl)phenyl]-3-phenyl-3H-naptho[2,1-b]pyran, 6-(N-morpholinyl)-3-phenyl-3-[4-(N-piperidinyl)phenyl]-3H-naphtho[2,1-b]pyran, 6-(N-morpholinyl)-3-phenyl-3-[4-(N-pyrrolidinyl)phenyl]-3H-naphtho[2,1-b]pyran, 3-phenyl-3-(2-fluorophenyl)-3H-naphtho[2,1-b]pyran, 6-(N-morpholinyl)-3,3-diphenyl-3H-naphtho[2,1-b]pyran, and 6-(N-morpholinyl-3-(4-methoxyphenyl)-3-phenyl-3H-naphtho[2,1-b]pyran.

However, the pyrans described in U.S. Pat. No. 5,753,146 and European patent no. EP 562,915 as well as photochromic dyes of other classes, for instance oxazines, e.g., the oxazines described in U.S. Pat. No. 5,753,146, or fulgides may also be used.

The photochromic plastic object according to the invention can furthermore be provided with one or more hard films to improve scratch resistance. In addition, one or more conventional antireflection coatings may also be provided, preferably on the side of the plastic object facing away from the light.

The present invention will now be explained in greater detail with reference to an illustrative example. The following embodiment is intended to describe the production of a photochromic film by way of example only. A person skilled in the art will readily be able to produce harder or softer products by making corresponding changes in the formula or in the process.

EXAMPLE 19.75 ml of a trifunctional aliphatic amine (T 5000 of Huntsman) and 0.75 ml of acrylic acid were mixed together in a beaker and allowed to react briefly. The mixture, which was thereby heated, was cooled again to room temperature. Furthermore, a mixture of 0.10 g spiro-9-fluoreno-13'-{3-[4-(N-piperidinyl)phenyl]-6-methoxy-3-phenyl-indeno[2,1-f]naphtho-[1,2-b]-pyran} in 17.5 g TMPTMA (Röhm GmbH) was prepared and stirred at 50° C. until a clear slightly light blue solution was obtained. 3.5 ml of this mixture together with 1.90 ml difunctional aliphatic isocyanate 316 (Bayer AG) and 0.065 g peroxide TBPND (Peroxidchemie) were added to the cooled amine acrylate mixture and mixed thoroughly. The resulting mixture was then cast between two PET films to form a photochromic film. Final cross-linking was effected in an oven at 84° C. for an hour.

As an alternative, the photochromic dye(s) can also be stirred into the amine acrylate solution.

FIG. 1 shows the darkening and lightening behavior of the photochromic plastic object produced in the foregoing example according to the invention as compared to a conventional photochromic polyacrylate material (measured at 23° C., 15 min darkening at 50 klux, 15 min lightening in the dark). FIG. 1 clearly shows the improved darkening and lightening behavior, i.e., the clearly more rapid darkening and lightening kinetics of the photochromic response of the respective photochromic dye used in the plastic material according to the invention (so-called "saw tooth characteristic" of the photochromic response).

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A photochromic plastic object comprising a transparent synthetic resin body composed of at least two interpenetrating polymer networks of different polymer materials and at least one photochromic dye homogeneously distributed therein, wherein one of the at least two interpenetrating polymer networks is composed of polyurea or polyurethane and wherein a second one of the at least two interpenetrating polymer networks is composed of polyacrylate, polymethacrylate or a mixture thereof.

2. A method of producing a transparent synthetic resin body composed of at least two interpenetrating polymer networks of different polymer materials and at least one photochromic dye homogeneously distributed therein, said method comprising initially producing a first polymer network composed of a first polymer material;

subsequently producing a second polymer network composed of a second polymer material different from said first polymer material in such a way that the two networks of different polymer materials interpenetrate, and adding the at least one photochromic dye before or during polymerization to form a transparent synthetic resin body composed of at least two interpenetrating polymer networks of different polymer materials and at least one photochromic dye homogeneously distributed therein.

3. A method according to claim 2, wherein said first polymer network is produced without using an initiator.

4. A method according to claim 2, wherein the first polymer network is produced by a polyaddition reaction, and the second polymer network is produced by thermal, radical or UV-light initiated polymerization.

5. A method according to claim 4, wherein the polyaddition reaction is carried out at room temperature and without using an initiator.

6. A composite comprised of a photochromic plastic object according to claim 1, and at least one inorganic material.

7. A photochromic plastic object according to claim 1, wherein the object is selected from the group consisting of lenses, visors, and window glazings.

8. A photochromic plastic object comprising a transparent synthetic resin body composed of at least two interpenetrating polymer networks of different polymer materials and at least one photochromic dye homogeneously distributed therein, wherein the at least one photochromic dye is introduced to the polymer networks by a mass dyeing process.

9. A method according to claim 4, comprising forming the body simultaneously with the steps of producing the networks.

* * * * *